United States Patent

Saito et al.

[11] Patent Number: 5,832,321
[45] Date of Patent: Nov. 3, 1998

[54] CAMERA

[75] Inventors: Tatsuo Saito; Shigenori Goto, both of Omiya, Japan

[73] Assignee: Fuji Photo Optical Co., Ltd., Omiya, Japan

[21] Appl. No.: 671,669

[22] Filed: Jun. 28, 1996

[30] Foreign Application Priority Data

Jun. 29, 1995 [JP] Japan .................................. 7-164015

[51] Int. Cl.⁶ ............................................... G03B 13/36
[52] U.S. Cl. ........................................... 396/130; 396/224
[58] Field of Search .......................... 354/485, 289.1, 354/289.11; 396/130, 223, 224

[56] References Cited

U.S. PATENT DOCUMENTS

| | | | |
|---|---|---|---|
| 4,974,011 | 11/1990 | Azuma et al. | 354/412 |
| 5,289,225 | 2/1994 | Hirai | 354/402 |
| 5,367,353 | 11/1994 | Amanuma et al. | 354/409 |
| 5,369,230 | 11/1994 | Misawa | 200/52 |
| 5,479,237 | 12/1995 | Kitaoka | 354/474 |

*Primary Examiner*—Safet Metjahic
*Assistant Examiner*—Michael Dalakis
*Attorney, Agent, or Firm*—Sixbey, Friedman, Leedom & Ferguson; David S. Safran

[57] ABSTRACT

In a camera of the present invention, when a shutter button is depressed half, a focusing and a photometry are executed. If the shutter button is held in a state of being depressed half, the results are retained. In this case, if an MF button is depressed, the photometry result is retained while the MF button 48 is being depressed, even if the shutter button is released. When the shutter button is depressed half again, only the photometry is performed.

19 Claims, 5 Drawing Sheets

CAMERA

BACKGROUND OF THE INVENTION

1. Field of the Invention

The present invention relates to a camera, and more particularly to a camera provided with an AF lock function which holds a focusing value for focusing by an automatic focusing (AF) mechanism and an AE lock function which holds a photometry value for controlling an automatic exposure (AE) mechanism.

2. Description of the Related Art

The conventional camera is provided with an AF lock function and an AE lock function for preparing for photographing when a shutter button is half depressed, and for performing the photographing when the shutter button is depressed completely. That is, when the shutter button is half depressed, an automatic focusing (AF) function measures a subject distance. The focusing is performed based on the result (a focusing value), and an automatic exposure (AE) function measures a subject brightness. A stop value and a shutter speed are set in accordance with the result (a photometry value) (exposure setting).

When the shutter button is depressed completely, the stop and the shutter speed are controlled in accordance with the exposure setting so that the shutter can be released.

In the above-mentioned camera, if the shutter button is held in a state of being half depressed, the shutter button holds the focusing value and the photometry value, which are obtained when the shutter button is half depressed (AF lock and AE lock) . For example, if the photographing is performed in a state that the focus point and the exposure are adjusted to the subject outside a focus area, the following operations are executed.

First, the photographing direction of the camera is turned to a subject which is desired to be focused, and the shutter button is depressed half-way so that the subject is focused. Then, the camera is positioned in a desired photographing direction while the shutter button is held in a state of being half depressed. Thus, the focus point and the exposure are adjusted to the subject outside the focus area when photographing.

However, if the photographing is performed by the conventional camera in such a manner that the subject outside the focus area is focused as mentioned above, it is disadvantageous if a subject brightness in photographing is different from a subject brightness in focusing, because the exposure corresponding to the subject outside the focus area is performed.

Furthermore, a sequential photographing by automatic focusing is faced with a problem in that it takes much time from the depression of the shutter button to the shutter release, because the focusing is performed every time the shutter button is half depressed. The subject distance hardly changes in the case of the sequential photographing. Therefore, it has been desired that in the automatic focusing mode, the focus point is selectively fixed once the focusing is performed, and the exposure is only controlled so that the shutter speed can become faster.

SUMMARY OF THE INVENTION

The present invention has been developed in view of the above-described circumstances, and has its object the provision of a camera which is provided with an AF lock function and an AE lock function for performing a focusing and a photometry when a shutter button is half depressed so as to retain the result while the shutter button is being half depressed, and which maintains only the AE lock and performs only the photometry in photographing so as to control an exposure corresponding to a subject in case of photographing.

In order to achieve the above-mentioned object, the present invention comprises: a two-step shutter button for turning on the first switch if depressed half-way and for turning on the second switch if depressed completely; a focusing means for measuring a subject distance; a photometry means for measuring a subject brightness; an automatic focus adjusting means for focusing in accordance with a focusing value transmitted from the focusing means; an automatic exposure means for controlling an exposure in accordance with a photometry value transmitted from the photometry means; a control means for receiving the focusing value and the photometry value from the focusing means and the photometry means so as to prepare for photographing, holding the focusing value and the photometry value while the first switch is on, and making the automatic exposure means perform the exposure in accordance with the held photometry value when the second switch is turned on; and is characterized in that the third switch is provided at a position where the third switch and the shutter button are operated simultaneously, and the control means holds the focusing value whether the first switch is on or off when if the third switch is on while the control means is holding the focusing value and the photometry value.

Moreover, in order to above-mentioned object, the present invention comprises: a two-step shutter button for turning on the first switch if depressed half-way and for turning on the second switch if depressed completely; a focusing means for measuring a subject distance; a photometry means for measuring a subject brightness; an automatic focus adjusting means for focusing in accordance with a focusing value transmitted from the focusing means; an automatic exposure means for controlling an exposure in accordance with a photometry value transmitted from the photometry means; a control means for receiving the focusing value and the photometry value from the focusing means and the photometry means so as to prepare for photographing, holding the focusing value and the photometry value while the first switch is on, and making the automatic exposure means perform the exposure in accordance with the held photometry value when the second switch is turned on; and is characterized in that the third switch is provided at a position where the third switch and the shutter button are operated simultaneously, and the control means makes the photometry means perform a re-photometry of the subject brightness if the third switch is turned on while the control means is holding the focusing value and the photometry value.

In order to above-mentioned object, the present invention comprises: a two-step shutter button for turning on the first switch if depressed half-way and for turning on the second switch if depressed completely; a focusing means for measuring a subject distance; a photometry means for measuring a subject brightness; an automatic focus adjusting means for focusing in accordance with a focusing value transmitted from the focusing means; an automatic exposure means for controlling an exposure in accordance with a photometry value transmitted from the photometry means; a control means for receiving the focusing value and the photometry value from the focusing means and the photometry means so as to prepare for photographing, for retaining the focusing value and the photometry value while the first switch is on, and for making the automatic exposure means perform the exposure in accordance with the retained photometry value when the second switch is turned on; and is characterized in that the third switch is provided at a position where the third switch and the shutter button are operated simultaneously, and the control means receives the focusing value from the focusing means when the third switch is turned on and holds the focusing value whether the first switch is on or off while the third switch is on.

Furthermore, according to the present invention, when the shutter button is half depressed to turn on the first switch, and the focusing value and the photometry value are held, and if the third switch, which is provided at a position where the third switch and the shutter are operated simultaneously, is on, the focusing value is held whether the first switch is on or off.

Moreover, according to the other mode, if the third switch, which is provided at a position where the third switch and the shutter are operated simultaneously, is turned on while the focusing value and the photometry value are being held after the shutter button is depressed one step to turn on the first switch, the photometry means performs the photometry of the subject brightness again, and the photometry value obtained by the re-photometry is held instead of the held photometry value.

Furthermore, according to the other mode, when the third switch, which is provided at a position where the third switch and the shutter button are operated simultaneously, is turned on, the control means receives the focusing value from the focusing means, and holds the focusing value whether the first switch is on or off while the third switch is on.

As a result, the focusing and the photometry can be carried out for two different subjects. The focusing value obtained by the focusing is retained, and only the photometry is performed in photographing so that the exposure can be controlled corresponding to the subject in case of photographing.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
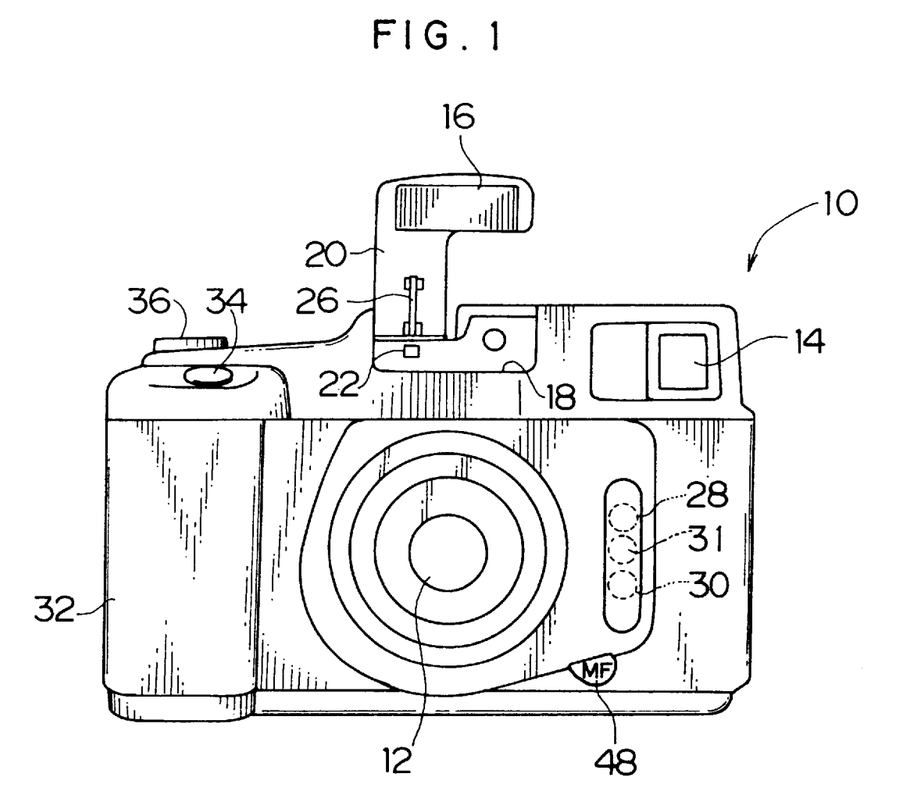
FIG. 1 is a front view of a camera, to which the present invention is applied.
Figure 2:
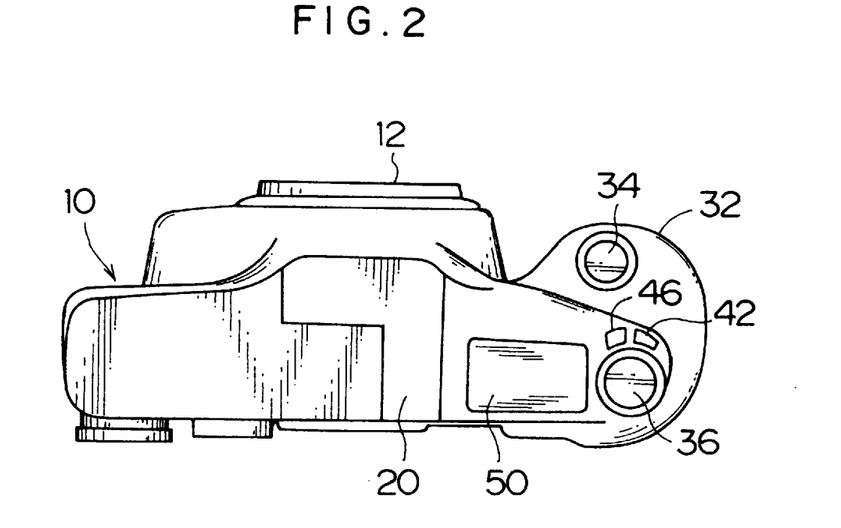
FIG. 2 is a top view of a camera, to which the present invention is applied.
Figure 3:
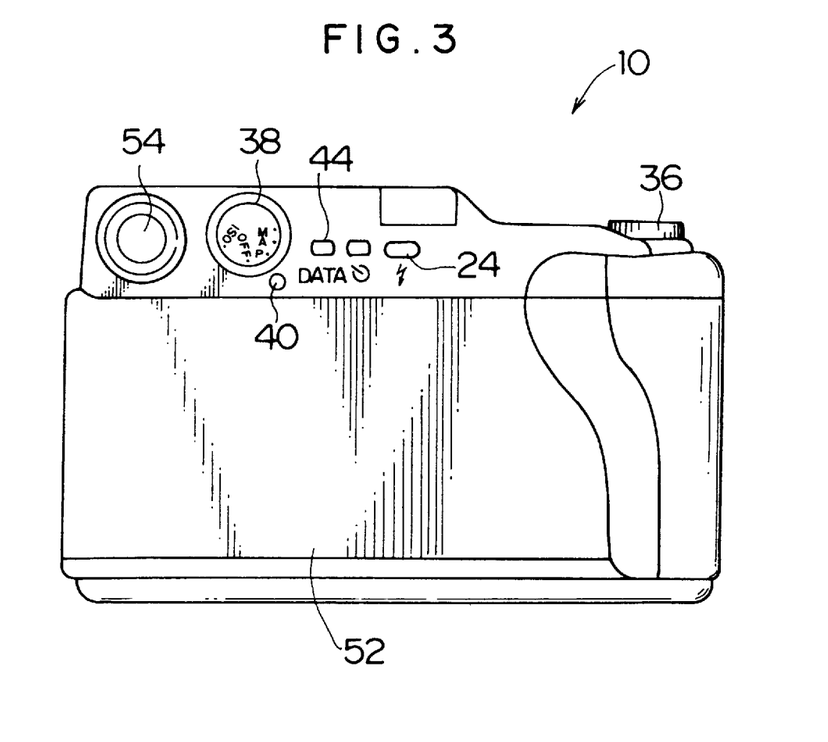
FIG. 3 is a rear view of a camera, to which the present invention is applied.

FIGS. 1, 2 and 3 are front view, top view, and rear elevation, respectively, of a camera, to which the present invention is applied.

The camera in the drawings uses Brownie film. A taking lens 12 is arranged at a substantially central part on a front surface of a camera's main body 10, and an illuminated finder 14 is arranged at a right corner in the drawing on the right side of the taking lens 12. A strobe flash part 16 is arranged above the taking lens 12, and is attached to a concave portion 18, which is formed at the top of the camera's main body 10. The strobe flash part 16 projects from and is stored in the concave portion 18. When the strobe flash part 16 is stored in the concave portion 18, an engagement groove (not shown), which is formed in an arm 20 of the strobe flash part 16, is engaged with a nail 22 at the concave portion 18. As a result, the strobe flash part 16 is held in a state of being stored in the concave portion 18. Moreover, a lock release button 24, which is provided at the back of the camera's main body 10 in FIG. 3, is depressed, so that the strobe flash part 16 projects from the concave portion 18 because of the bias force applied by a member (not shown), and is held at a position as shown in FIG. 1. The rigidity of the arm 20 projecting from the concave portion 18 is improved by a link mechanism 26.

An AF light projector 28, an AF light acceptor 30, and an AE light acceptor 31 are arranged close to each other on the right side of the taking lens 12 in the drawing. Furthermore, a grip portion 32 is formed on the left side of the camera's main body 10 in the drawing, and a shutter button 34 is provided at the top of the grip part 32.

As shown in FIGS. 1 and 2, an UP/DOWN dial 36 is arranged close to the shutter button 34. The UP/DOWN dial 36 is rotated for selecting a desired value in a mode selected by a select dial 38, which is provided at the back of the camera's main body 19 in FIG. 3. A select dial lock button 40 is depressed so that the lock can be released and the select dial 38 can be rotated. As a result, one of modes "M", "A","P", "OFF", and "ISO" is selected. For example, if the mode "M" is selected by the select dial 38, and the UP/DOWN dial 36 is rotated, a stop value and a shutter speed can be selected. If the mode "A" is selected, a stop value can be selected.

Moreover, if the mode "P" is selected by the select dial 38 and then the UP/DOWN dial 36 is rotated while an exposure correction button 42 is being depressed, an exposure value can be corrected. If the UP/DOWN dial 36 is rotated while a "DA TA" button 44 (see FIG. 3) is being depressed, the date can be changed.. Further, if the UP/DOWN dial 36 is rotated while an "MF" button 48 is being depressed, a focal length can be set.

If the mode "ISO" is selected and then the UP/DOWN dial 36 is rotated, an ISO range can be selected. Values in each mode, which are selected in the above-mentioned manner, are displayed on an LCD panel 50, which is arranged close to the UP/DOWN dial 36. When "OFF" is selected by the select dial 38, a main power source of the camera is turned off. Incidentally, the UP/DOWN dial 36 can drive a film feeding motor, which is built in the camera's main body, so as to feed the leader part of the film and make a wind-up spool wind up the leader part. The number 54 indicates an eyepiece of the finder 14.

Figure 4:
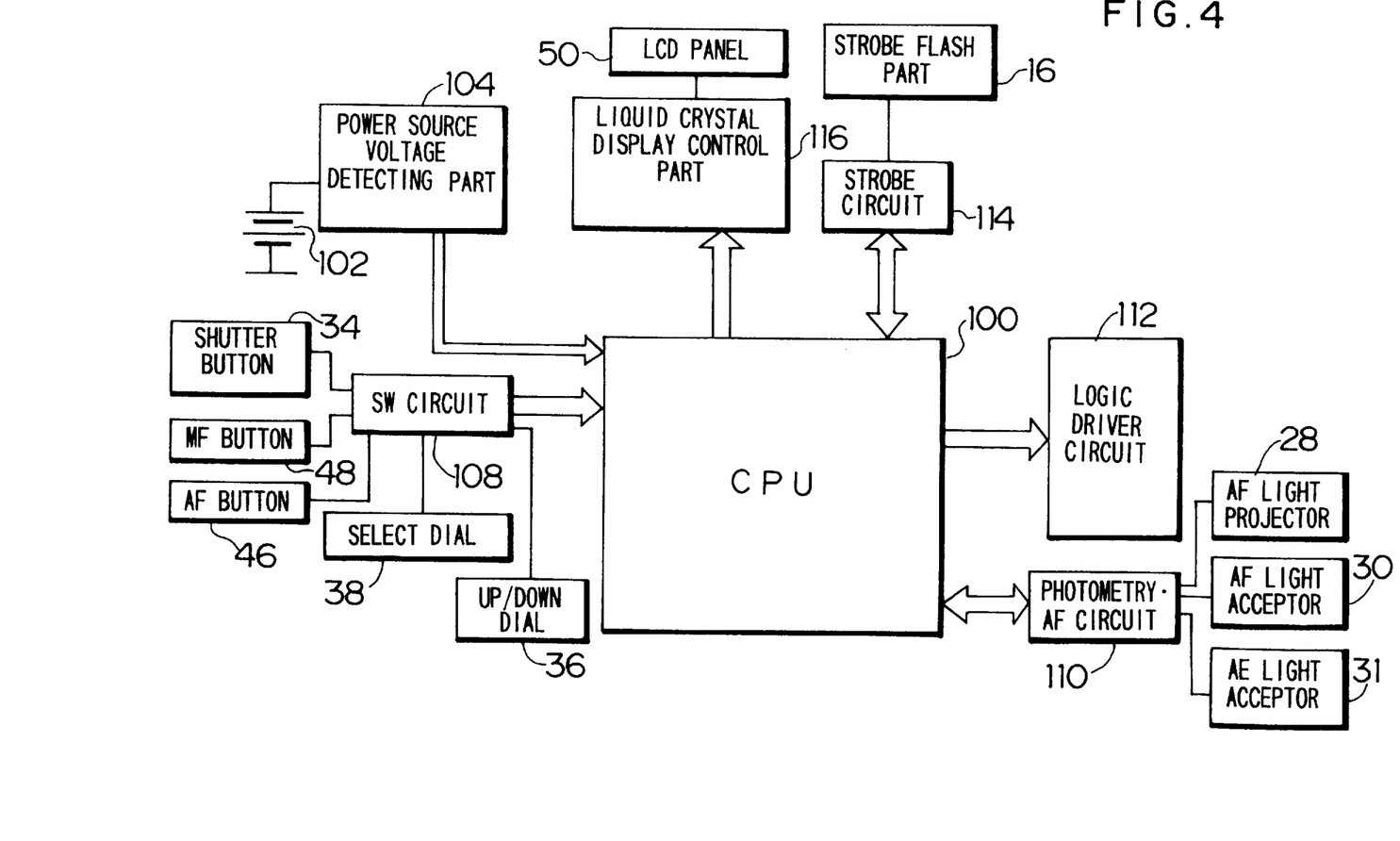
FIG. 4 is a block diagram showing a control part of a camera, to which the present invention is applied.

FIG. 4 illustrates a structure of one embodiment for the control part in the above-mentioned camera.

As shown in FIG. 4, the control part of the camera comprises a central processing unit (CPU) 100, an electric battery 102, a power source voltage detecting part 104, a switch circuit (SW circuit) 108, a photometry/automatic focusing (AF) circuit 110, a logic driver circuit 112, a strobe circuit 114, and a liquid crystal display control part 116.

The power source voltage detecting circuit 104 detects the voltage of the electric battery 102, and converts the voltage value into a digital signal by an A/D converter to output it to the CPU 100. Then, the CPU 100 performs a battery checking of the electric battery 102 in accordance with the voltage value indicated by the digital signal.

When the shutter button 34 is half depressed, the battery checking is performed. When the shutter button 34 is half depressed, the CPU 100 detects a voltage of the electric battery 102, which is transmitted from the power source voltage detecting part 104. Then, the CPU outputs the detected voltage to the liquid crystal display control part 116, and displays the residual capacity of the electric battery 102 on the LCD panel 50.

If the capacity of the electric battery 102 has been used to an extent that the photographing is impossible, a warning such as the battery shortage is displayed on the LCD panel 50, and the shutter release is prohibited.

The switch circuit 198 detects the state of each operation part, which is provided in the camera, and outputs a signal indicating the state to the CPU 100. For example, the switch circuit 108 outputs a signal indicating the half depression and complete depression of the shutter button 34, a signal indicating a mode selected by the select dial 38, a signal indicating an automatic focusing mode or a manual focusing mode selected by the AF button 46, a signal indicating whether the MF button 48 is depressed or not, and other signals. The CPU 100 performs each process in accordance with these signals.

When the shutter button 34 is depressed half-way and the photometry is instructed by the CPU 100, the photometry/AF circuit 110 measures a subject brightness by detecting a subject light from the AE light acceptor 30 (photometry), and outputs the measurement results (photometry value) to the CPU 100. Furthermore, when the focusing is instructed, the circuit 110 accepts the light, which is projected by the AE light projector 28, at the AF light acceptor 30. Then the circuit 110 measures a subject distance in a triangulation method (focusing), and outputs the measurement results (focusing value) to the CPU 100.

The CPU 100 stores the focusing value or the photometry value, which is transmitted from the photometry/AF circuit 110, in an internal memory. The CPU 100 also sets a focus point position, a stop value and a shutter speed of the taking lens 12 in accordance with the focusing value and the photometry value stored in the internal memory. Then the CPU outputs the focus point position, the stop value and the shutter speed to the logic driver circuit 112. Incidentally, when the shutter button 34 is half depressed, the focus point position of the taking lens 12 is set in accordance with the focusing value in the internal memory, and is transmitted to the logic driver circuit 112. When the shutter button 34 is completely depressed, the stop value and the shutter speed are set in accordance with the photometry value in the internal memory, and is transmitted to the logic driver circuit 112. When both the shutter button 34 and the MF button 48 are released, the focusing value and the photometry value in the internal memory are cleared.

The logic driver circuit 112 controls the driving of the taking lens 12, the stop, and the shutter, and adjusts the focus point and the exposure in accordance with the set values of the focus point position, the stop value and the shutter speed of the taking lens 12, which are transmitted from the CPU 100.

When the shutter button 34 is half depressed, and is kept in this state in the case that the automatic focusing mode is selected by the AF button 46, the AF lock function and the AE lock function work so as to hold the focusing value and the photometry value stored in the internal memory of the CPU 100. The detailed explanation will be given later.

In this case, if the MF button 48 is depressed, the CPU 100 holds the focusing value stored in the internal memory, and keeps the AF lock, regardless of the state of the shutter button 34, while the MF button 48 is being depressed (while the MF button 48 is being depressed, the CPU 100 does not instruct the photometry/AF circuit 110 to perform the focusing, and holds the focusing value stored in the internal memory, regardless of the state of the shutter button 34).

For example, when the shutter button 34 is released once and half depressed again while the MF button 48 is being depressed, the CPU outputs only the photometry instruction to the photometry/AF circuit 110. Then, the CPU 100 reads the photometry value from the photometry/AF circuit 110, and stores the photometry value in the internal memory. The CPU 100 sets the focus point position of the taking lens 12 in accordance with the focusing value stored in the internal memory, and transmits the value to the logic driver circuit 112. If the shutter button 34 is completely depressed, the CPU 100 sets the stop value and the shutter speed in accordance with the photometry value stored in the internal memory, and transmits these values to the logic driver circuit 112.

The strobe circuit 114 charges up when a stroboscopic photographing is performed, and flashes the strobe flash part 16 when receiving an instruction at a predetermined timing from the CPU 100 in response to the shutter release.

In the camera which is constructed in the above-mentioned manner, if the automatic focusing mode is selected by the AF button 46 and the shutter button 34 is half depressed, the focusing and the photometry are performed. If the shutter button 34 is held in a state of being half depressed, the results (the focusing value and the photometry value) are held. That is, the camera has the AF lock function and the AE lock function.

The AF lock and the AE lock work simultaneously upon the half depression of the shutter button 34, and are also released simultaneously. Therefore, the focusing and the photometry cannot be performed for two different subjects. In the present invention, the shutter button 34 is half depressed, and the MF button 48 is used, so that the focusing and the photometry can be performed for two different subjects.

An explanation will hereunder be given of an example which the MF button 48 is used. In the automatic focusing mode, if the subject outside the focus area is focused and an exposure is adjusted in a photographing direction in photographing, the camera is turned in the direction of a subject to be focused, and the shutter button 34 is half depressed. As a result, the focusing and the photometry of the subject are performed, and the focusing is performed in accordance with the focusing result (the focusing value). Then, the results of the focusing and the photometry (the focusing value and the photometry value) are held in such a state that the shutter button 34 is being half depressed. In this case, the MF button 48 is depressed in a state that the shutter button 34 is half depressed. (Thus, the focusing value is held even if a finger is removed from the shutter button 34.) Next, the shutter button 34 is released once in a state that the MF button 48 is being depressed. The camera is positioned in the photographing direction, and the half depression and the complete depression of the shutter are sequentially performed, so that the shutter can be released. The last time the shutter button 34 is depressed half-way the MF button 48 is depressed. Therefore, the photometry is only performed in such a state that the focusing value is held. When the shutter button 34 is completely pushed, the exposure is controlled in accordance with the photometry value.

As has been described above, the focusing can be performed for an optional subject, and the photometry can be performed for a subject in case of photographing by means of the MF button 48.

Moreover, when the shutter button 34 is pushed completely in the above-mentioned example which the MF button 48 is used, the shutter button 34 is held in a state of being half depressed so that the focusing value and the photometry value can be held. In this state, the shutter release can be performed in a different photographing direction. That is, the focusing and the photometry can be performed for an optional subject, regardless of the subject in case of photographing.

Furthermore, when the sequential photographing is performed in a state that the focus point is fixed, the MF button 48 is depressed in the above-mentioned manner so as to retain the focusing value, and the shutter button 34 is sequentially depressed completely. The photographing intervals are short because the focusing is not performed, and the photometry is executed ever time the photometry is performed. Therefore, the photographing can be carried out in a proper exposure.

Figure 5:
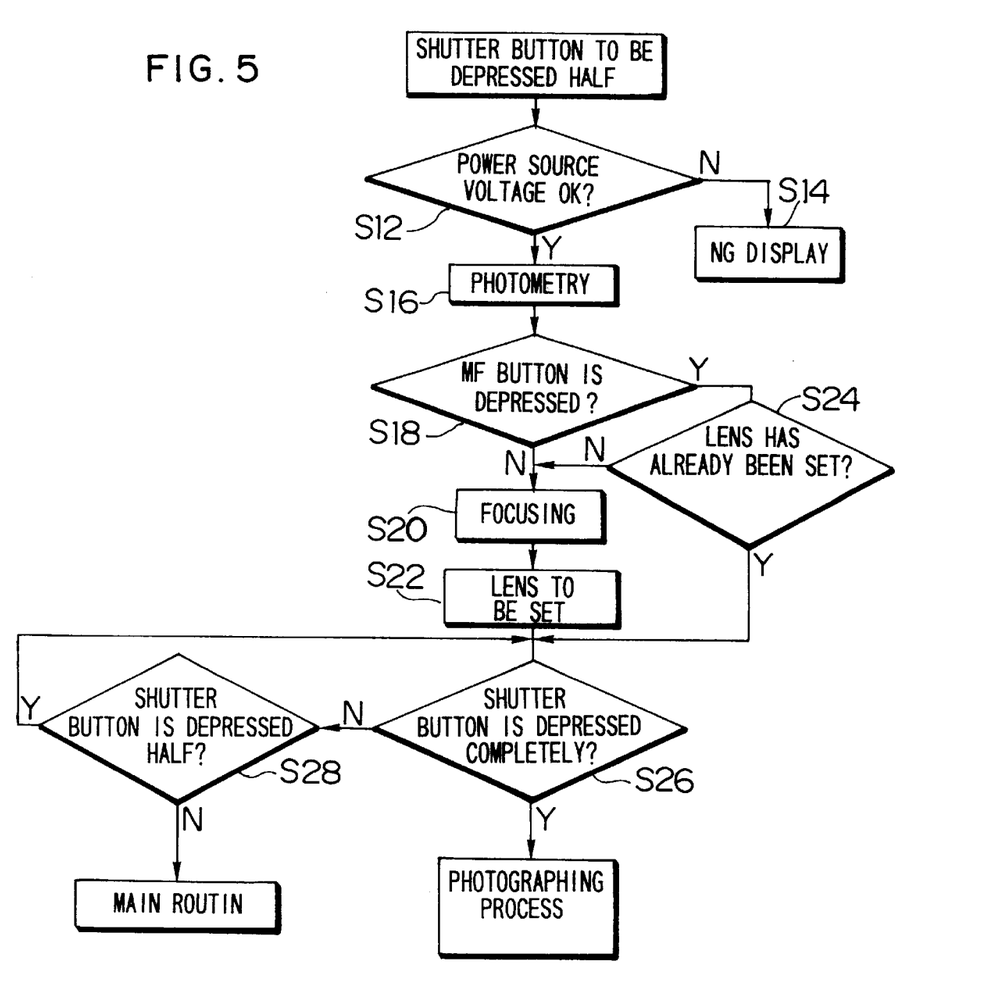
FIG. 5 is a flow chart showing an operation of an MF button.

An explanation will hereunder be given of an operation of the MF button 48 with reference to the flow chart in FIG. 5.

FIG. 5 shows a control procedure of the CPU 100 when the shutter button is half depressed in the automatic focusing mode in the above-mentioned camera.

In the automatic focusing mode, if the shutter button 34 is half depressed, a switch circuit 108 transmits a signal indicating the half depression of the shutter button 34 to the CPU 100. The CPU 100 executes a process routine as shown in FIG. 5. In this process routine, a voltage of the electric battery 102 is read from the power source voltage detecting part 104, so that the battery can be checked (step S12). In this case, if the battery is insufficient, the battery shortage is displayed on the LCD panel 50 (step S14).

If the battery is sufficient, a photometry process is executed (step S16). That is, the CPU 100 instructs the photometry /AF circuit 110 to perform the photometry. Then the CPU 100 reads the photometry value from the photometry *AF circuit 110, and stores the photometry value with an internal memory.

Next, it is determined whether the MF button is depressed or not (step S18). That is, it is determined whether or not the switch circuit 108 transmits a signal indicating that the MF button is depressed. If the MF button 48 is not depressed, the CPU 100 instructs the photometry *AF circuit 110 to execute the focusing. The photometry *AF circuit 110 measures the subject distance (step S20). The CPU 100 sets a position of the focus point for the taking lens 12, and transmits the value to the logic driver circuit 112 for focusing (step S22).

On the other hand, if the MF button 48 is depressed, it is judged whether the taking lens 12 has already been focused or not (step S24) . That is, the CPU 100 judged whether the focusing value is stored in the internal memory or not. (For example, if the shutter button 34 is depressed half after the MF button 48 is depressed, the focusing has not been performed yet, so the focusing value is not stored in the internal memory.)

If the taking lens 12 has not been focused yet, the process returns to step S20, and executes the photometry (step S20) and focuses the taking lens 12 (step S22) in the abovementioned manner.

In step S24, if the taking lens 12 has already been focused, the process goes on to step S26.

In step S26, it is determined whether the shutter button 34 is completely depressed or not (step S26). That is, it is determined whether the switch circuit 108 transmits a signal indicating that the shutter button 34 is depressed completely or not. If the shutter button 34 has not been completely depressed yet, it is judged whether the shutter button 34 is half depressed or not (step S28). If the shutter button is half depressed, the process returns to step S26.

That is, in the judgement in steps S26 and S28, the state of the shutter button 34 is detected. If the shutter button 34 is half depressed, the exposure is controlled in accordance with the photometry value stored in the internal memory so that the shutter can be released (step S30) . If the half depression of the shutter button 34 is released, the process returns to a main routine (step S30).

Incidentally, a switch signal from the switch circuit 108 is detected in the main routine. If some switch signal is transmitted from the switch circuit 108, a process routine is executed in accordance with the switch signal.

In the above-mentioned process by the CPU 100, The focusing value can be retained, and only the photometry can be performed when the shutter button 34 is depressed half.

Incidentally, in this embodiment, when the MF button 48 is depressed, only the AF lock can be maintained by the MF button 48, so that the AF lock and the AE lock can be performed independently of each other. However, the present invention is not limited to this. For example, if the MF button 48 is depressed when the shutter button 34 is depressed and the AF lock and the AE lock work, one lock may be released once, and may be locked again after the measurement is carried out again.

Furthermore, if the MF button 48 is depressed, one of the focusing and the photometry is executed, and the measurement result is locked. If the shutter button 34 is half depressed in such a state that the MF button 48 is being depressed, one of the focusing and the photometry, which was not executed by the MF button 48, is performed.

Furthermore, in this embodiment, the lock function works while the MF button 48 is being depressed; however, the present invention is not limited to this. For example, it is possible that the lock function works when the MF button 48 is depressed, the lock function works, and the lock function is released when the MF button is depressed again.

As has been described above, according to the camera of the present invention, the third switch is provided at a position in such a manner to be operated with the shutter button. By means of the third switch, only the AF lock is retained so that only the photometry can be performed in photographing, and the exposure can be controlled in accordance with the subject in photographing.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A camera comprising:

a two-step shutter button for turning on a first switch when depressed half-way and for turning on a second switch when depressed completely;

distance measuring means for measuring a subject distance;

photometry means for measuring a subject brightness;

automatic focus adjusting means for focusing based on a focusing value held by control means;

automatic exposure means for controlling an exposure based on a photometry value held by said control means;

re-photometry instruction means comprising a third switch; and said control means for receiving the focusing value and the photometry value from the distance measuring means and the photometry means so as to prepare for the exposure when the first switch is turned on, holding the focusing value and the photometry value while the first switch is on, and making the automatic exposure means perform the exposure upon actuation of said second switch;

wherein said control means enables said photometry means to produce a new photometry value upon actuation of said third switch while said first switch is on before the actuation of said second switch by which the photometry value is reset to the new value thereof whereas the focusing value is retained.

2. The camera according to claim 1, wherein the third switch is a push button switch provided on a camera body at a position where the push button switch and the shutter button are operated simultaneously.

3. A camera comprising:

a two-step shutter button for turning on a first switch when depressed half-way and for turning on a second switch when depressed completely;

distance measuring means for measuring a subject distance;

photometry means for measuring a subject brightness;

automatic focus adjusting means for focusing based on a focusing value held by control means;

automatic exposure means for controlling an exposure based on a photometry value held by said control means;

focusing instruction means comprising a third switch; and said control means for receiving the focusing value and the photometry value from the distance measuring means and the photometry means so as to prepare for the exposure when the first switch is turned on, holding the focusing value and the photometry value while the first switch is on, and making the automatic exposure means perform the exposure upon actuation of said second switch;

wherein said control means enables said distance measuring means to produce a new focusing value upon actuation of said third switch while said first switch is on before the actuation of said second switch by which the focusing value is reset to the new value thereof whereas the photometry value is retained.

4. The camera according to claim 3, wherein the third switch is a push button switch provided on a camera body where the push button switch and the shutter button are operated simultaneously.

5. A camera comprising:

a two-step shutter button for turning on a first switch when depressed half-way and for turning on a second switch when depressed completely;

distance measuring means for measuring a subject distance;

photometry means for measuring a subject brightness;

automatic focus adjusting means for focusing based on a focusing value held by control means;

automatic exposure means for controlling an exposure based on a photometry value held by said control means;

said control means for receiving the focusing value and the photometry value from the distance measuring means and the photometry means so as to prepare for the exposure when the first switch is turned on, holding the focusing value and the photometry value while the first switch is on, and making the automatic exposure means perform the exposure upon actuation of said second switch in a normal mode; and a third switch for producing an override mode which overrides said normal mode;

wherein said control means is responsive to turning on of said third switch for enabling only a selected one of both of said distance measuring means and said photometry means to respectively produce a new focusing value or a new photometry value, respectively, when said first switch is actuated after actuation of said override mode by the third switch by which the respective one of the focusing value and the photometry value is reset to the new value thereof.

6. The camera according to claim 5, wherein the third switch is a push button switch provided on a camera body at a position where the push button switch and the shutter button are operated simultaneously.

7. The camera according to claim 6, wherein the third switch is turned on when the push button is depressed, and the third switch is turned off when the push button is released.

8. The camera according to claim 6, wherein the third switch is turned on and off repeatedly every time the push button is depressed.

9. A camera according to claim 5, wherein said override mode is initiated by said control means responsive to turning on of said third switch while a focusing value and a photometry value are being held; wherein said control means holds the focusing value during said override mode and produces a replacement of the held photometry value with a new photometry value upon turning off and on of the first switch while the third switch remains turned on.

10. A camera according to claim 5, wherein said override mode is initiated by said control means responsive to turning on of said third switch while a focusing value and a photometry value are being held; wherein said control means holds the focusing value during said override mode and produces a replacement of the held photometry value with a new photometry value upon turning on of the second switch while the third switch remains turned on.

11. A camera according to claim 5, wherein said override mode is initiated by said control means responsive to turning on of said third switch; wherein said control means receives the focusing value from the distance measuring means upon turning on of said third switch and causes said focusing value to be held; and wherein the control means receives only the photometry value from said photometry means upon turning on of the first switch while the third switch remains turned on, the focusing value held being retained.

12. A camera comprising:

a two-step shutter button for turning on a first switch when depressed half-way and for turning on a second switch when depressed completely;

distance measuring means for measuring a subject distance;

photometry means for measuring a subject brightness;

automatic focus adjusting means for focusing based on a focusing value held by control means;

automatic exposure means for controlling an exposure based on a photometry value held by said control means;

photometry instruction means comprising a third switch; and said control means for receiving the photometry value from said photometry means when said third switch is turned on, holding the photometry value while said third switch is on, receiving the focusing value from said distance measuring means when said first switch is turned on, holding the focusing value while said first switch is on, and making said automatic exposure means perform the exposure upon actuation of said second switch.

13. A camera according to claim 12, wherein said control means enables said photometry means to produce a new photometry value upon turning off and on of said third switch while said first switch remains turned on before the actuation of said second switch by which the photometry value is reset to the new value thereof whereas the focusing value is retained.

14. A camera according to claim 12, wherein said control means enables said distance measuring means to produce a new focusing value upon turning off and on of said first switch while said third switch remains turned on before the actuation of said second switch by which the focusing value is reset to the new value thereof whereas the photometry value is retained.

15. A camera according to claim 12, wherein said control means holds the photometry value and the focusing value while said first switch is on.

16. A camera comprising:

a two-step shutter button for turning on a first switch when depressed half-way and for turning on a second switch when depressed completely;

distance measuring means for measuring a subject distance;

photometry means for measuring a subject brightness;

automatic focus adjusting means for focusing based on a focusing value held by control means;

automatic exposure means for controlling an exposure based on a photometry value held by said control means;

focusing instruction means comprising a third switch; and said control means for receiving the focusing value from said distance measuring means when said third switch is turned on, holding the focusing value while said third switch is on, receiving the photometry value from said photometry means when said first switch is turned on, holding the photometry value while said first switch is on, and making said automatic exposure means perform the exposure upon actuation of said second switch.

17. A camera according to claim 16, wherein said control means enables said distance measuring means to produce a new focusing value upon turning off and on of said third switch while said first switch remains turned on before the actuation of said second switch by which the focusing value is reset ot the new value thereof whereas the photometry value is retained.

18. A camera according to claim 16, wherein said control means enables said photometry means to produce a new photometry value upon turning off and on of said first switch while said third switch remains turned on before the actuation of said second switch by which the photometry value is reset to the new value thereof whereas the focusing value is retained.

19. A camera according to claim 16, wherein said control means holds the focusing value and the photometry value while said first switch is on.

* * * * *